United States Patent [19]
O'Leary et al.

[11] 3,905,905
[45] Sept. 16, 1975

[54] FILTER UNIT

[75] Inventors: Stephen H. O'Leary, San Diego; Paul J. Melton, Carlsbad, both of Calif.

[73] Assignee: IVAC Corporation, La Jolla, Calif.

[22] Filed: Jan. 11, 1974

[21] Appl. No.: 432,466

[52] U.S. Cl. ................ 210/436; 55/159; 210/445; 210/DIG. 23
[51] Int. Cl.² ........................................ B01D 35/00
[58] Field of Search ........ 55/36, 159; 210/436, 445, 210/497, 499–501, DIG. 23

[56]         References Cited
            UNITED STATES PATENTS

| | | | |
|---|---|---|---|
| 3,471,019 | 10/1969 | Trasen et al. | 210/445 X |
| 3,701,433 | 10/1972 | Krakauer et al. | 210/436 |
| 3,778,973 | 12/1973 | Martinez | 55/199 |
| 3,803,810 | 4/1974 | Rosenberg | 55/159 |

Primary Examiner—Charles N. Hart
Assistant Examiner—Richard W. Burks
Attorney, Agent, or Firm—Fulwider, Patton, Rieber, Lee & Utecht

[57] ABSTRACT

A lightweight filter unit consisting of a filter disposed within a housing to define upper and lower filter chambers. The upper half of the housing is provided with a central channel and peripheral channels for collecting entrapped air and an air extracting port communicating with the central channel for removing entrapped air without interruption of the filtering operation. The lower half of the housing is provided with elongated upstanding ribs extending parallel to the longitudinal axis of the lower housing for supporting the filter. The interior ribs are of a greater height than the outer ribs so as to define a filter support surface which slopes downwardly from the center of the lower filter chamber to provide a filter surface in which at least a portion of the filter is non-horizontal regardless of the orientation of the filter unit.

16 Claims, 4 Drawing Figures

PATENTED SEP 16 1975　　　3,905,905 ns.

FILTER UNIT

BACKGROUND OF THE INVENTION

The invention relates generally to improvements in filter units and more particularly to a filter unit which is resistant to air locks due to entrapped air.

In intravenous therapy, particularly long term intravenous therapy, infection is a great hazard. One source of infection is due to contaminants entering the blood stream by way of the parenteral fluid which readily supports bacterial and fungical organisms.

To eliminate this source of infection and to remove unsolubilized matter from the fluid, a filter is placed in the intravenous line. The filter acts as a sieve for particlant matter and depending upon the filter pore size as an absolute barrier to bacteria. In addition the filter acts as a barrier to screen out air which may be entrapped in the intravenous system.

The filter is normally housed in a lightweight housing which is secured to the patient adjacent the point of insertion of the needle. Normally, this will be on the patient's arm.

Filter units suitable for the removal of bacteria and fungical organisms in intravenous fluids are described in U.S. Pat. No. 3,471,019. In operation the fluid to be filtered is led into the upper chamber, forced through the membrane filter and led out of the lower chamber. Filterable material is collected on the upper surface of the filter and air which is present in the parenteral fluid is also collected in the upper chamber. In the normal operating position, the filter surface is usually substantially horizontal and the collected air appears as a bubble in the upper chamber which must be extracted from time to time to avoid an air lock.

Prior art filters are position sensitive and should the position of the filter surface change, such as by movement of the patient, the collected air, which normally is impressed against the upper surface of the upper chamber, has a tendency to be displaced against the filter surface, thereby blocking the filter surface against which it rests and causing a reduction in the effective filtering surface. In the extreme case, when the filter is inverted, the collected air may block the entire effective filtering surface and result in stoppage of the parenteral fluid flow. It should also be pointed out, however, that blockage of fluid flow through the filter can occur if a sufficient volume of air is trapped in the upper chamber, regardless of the position of the filter.

Air is normally removed from the prior art filters by disengaging the line leading to the filter so as to allow the air to escape. This procedure may result in at least a partial interruption of the flow of parenteral fluid and if not carefully carried out, may result in the loss of some fluid. It is also difficult to remove all of the air from the filter area.

The position sensitivity of the filter and the inconvenience of air removal from the system are deficiencies in the prior art filtering systems which the present invention has overcome.

SUMMARY OF THE INVENTION

The present invention provides an improved filter unit which is relatively position insensitive and which is provided with means for trapping and removing air from the filter area without disturbing the flow of parenteral fluid and without disturbing the connections between the source of parenteral fluid and the filter unit.

A filter unit, in accordance with the present invention, includes upper and lower filter chambers, separated by a filter disposed between these chambers, the shape of the filter surface being selected to minimize impairment of fluid flow due to blockage by entrapped air.

The filter chamber may be defined by upper and lower housings. The lower housing is provided with means for supporting the filter. The filter is supported so that at least a portion of the filter surface is nonhorizontal in every conceivable position of the filter unit.

Channels in the upper filter housing define a central air passage and peripheral air passages, which communicate with each other and with the upper filter chamber for the collection of entrapped air. An air extraction port communicates with the central air passage for the removal of air from the central and peripheral air passages.

Other more detailed features of the filter unit of this invention reside in the configuration of the support ribs and the provision of an air extraction fitting which seals the air extraction port and which allows for the removal of air from the filter unit without disturbing the flow of parenteral fluid through the unit and without damaging the filter. Other features and advantages of the filter unit of this invention will become apparent from the following detailed description taken in conjunction with the drawings.

DESCRIPTION OF THE PREFERRED EMBODIMENT

Figure 1:
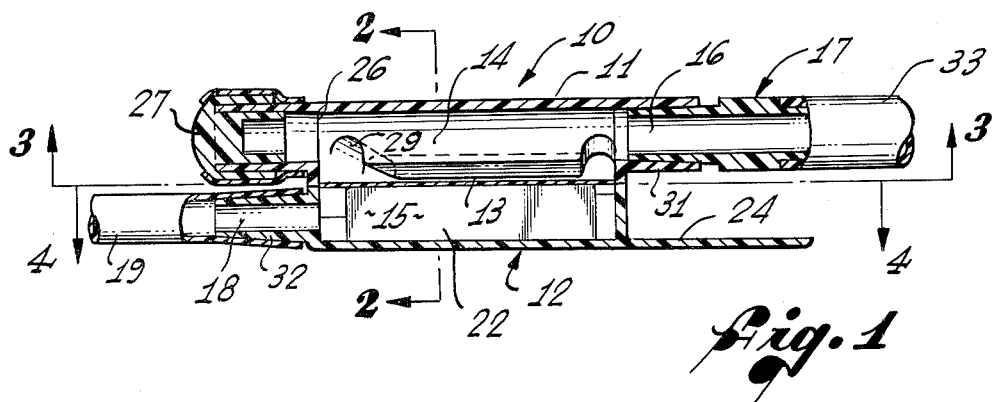
FIG. 1 is a cross-sectional view of a presently preferred embodiment of a filter unit constructed in accordance with the invention.

Referring now to the drawings, a filter unit 10 constructed in accordance with this invention comprises in its normal operating orientation an upper housing 11 and a lower housing 12. Disposed between the upper housing 11 and the lower housing 12 is a filter 13 which separates the interior of the filter unit 10 into an upper filter chamber 14 and a lower filter chamber 15.

An inlet port 16 communicates with the upper filter chamber 14 and a source of parenteral fluid via a conventional "Luer" fitting 17 and tubing, not shown. An outlet port 18 is provided in the lower housing 12 and communicates with the lower filter chamber 15. A tube 19 is connected to the outlet port 18, such as at outlet nipple 32, for leading filtered parenteral fluid out of the filter unit to the area of administration.

In the preferred mode of operation, the filter unit is disposed adjacent the point of injection of the parenteral fluid. The filter unit is preferably secured to the patient by tape or suitable strapping material (not shown).

Any suitable filter may be utilized in the filter unit although preferred filters are the so called membrane filters such as those manufactured by the Millipore Corporation, Bedford, Mass. or the Nuclepore Corp., Pleasanton, California. Likewise, the pore size may be varied depending on the nature of the parenteral fluid being filtered. For most intravenous operations it is preferred that the filter have a small pore size, preferably on the order of 0.1 micrometers so that the effective filtration of bacteria as well as particulate matter is achieved. Also with the small pore sizes, filtration of air in the system is assured.

Normally when employing filters having pore sizes small enough to filter bacteria, it is preferred to employ a pump in the intravenous system to provide sufficient pressure to overcome the head pressure of the filter unit and to assure adequate flow rate of parenteral fluid. It is preferred to have a capability of passing a parenteral fluid at the rate of 200 ml/hr under a pump induced differential pressure of 10 psid or less.

Figure 2:
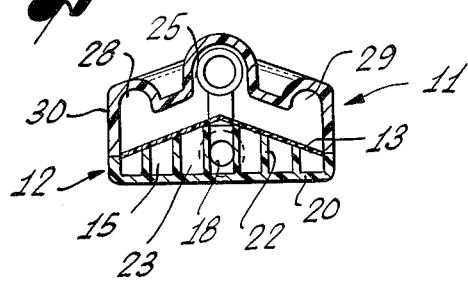
FIG. 2 is a cross-sectional view taken along line 2—2 of FIG. 1.
Figure 4:
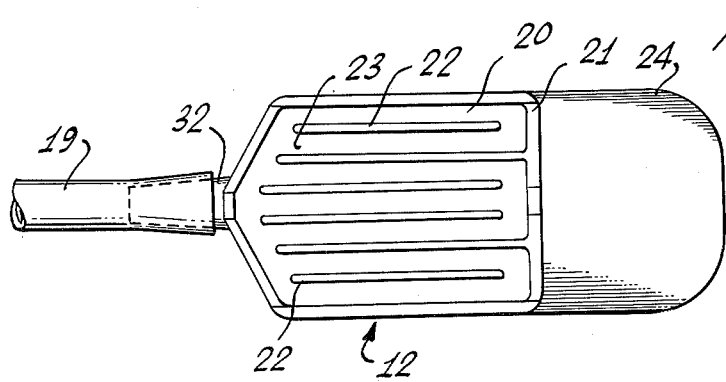
FIG. 4 is a plan view of the lower housing of the filter unit of the present invention.

As is more specifically shown in FIGS. 1, 2 and 4, the lower housing 12 comprises a base 20 on which is carried an upstanding peripheral wall member 21 which defines the interior of the lower filter chamber 15. The outlet port 18 communicates with the interior of the lower filter chamber 15 through the wall member 21. The wall member 21 adjacent either side of the outlet port 18 is angled with respect to the axis of rotation of the outlet port 18 so that in plan configuration (FIG. 4) the wall member 21 is funnel-shaped to direct air out of the lower filter chamber 15 towards the outlet port 18 when filling the unit during start up of the filtering operation.

Disposed on the base 20 and surrounded by the wall member 21 are a plurality of parallel, spaced apart, upstanding, elongated support ribs 22 for supporting the filter 13. Spaces between the support ribs 22 define fluid channels 23. The support ribs 22 extend longitudinally parallel to the axis of the outlet port 18. The channels 23 formed between adjacent ribs 22 direct the flow of air and parenteral fluid towards the outlet port 18. The support ribs 22 vary in height, with the inner ribs being of greater height than the outer ribs so as to define a support surface for the filter which is inclined downwardly and outwardly in a direction normal to the longitudinal axes of the support ribs 22. The filter, when carried by the support ribs, thus presents a filtering surface wherein at least a portion of the filtering system is non-horizontal regardless of the position of the filter. Thus, even should the filtering element be in an entirely inverted position, air which would normally lodge against the filter surface of the filter and either reduce or stop filtration, will be directed away from the non-horizontal portions of the filtering surface. In this manner complete stoppage of the filtering operation by an air lock is substantially prevented.

In the preferred embodiment shown, the slope of the filtering surface is in a direction normal to the longitudinal axes of the support ribs 22. It should be clear, however, that the filtering surface may be adapted to provide similar sloping in a direction parallel to the longitudinal axes of the support ribs 22. It is preferred, however, that the slope of the filtering surface be as illustrated as it aids in the collection and removal of entrapped air from the filtering unit in the manner to be described hereinafter.

A portion of the base 20 is extended to a flange 24 for securing the filter unit to the patient during filtering operation.

Figure 3:
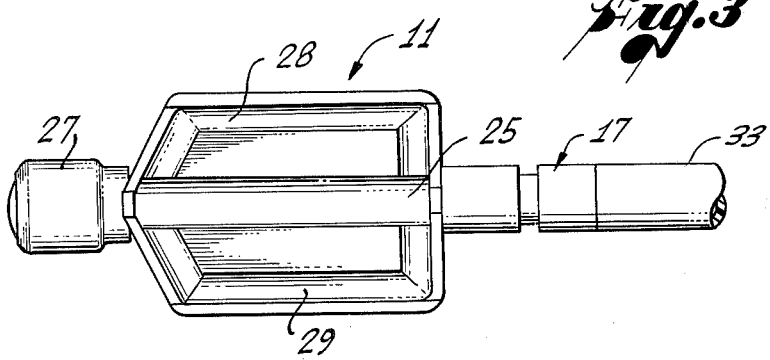
FIG. 3 is a plan view of the upper housing of the filter unit of the invention.

As more specifically shown in FIGS. 1, 2 and 3, the upper housing 11 is provided with a central channel 25 which extends along the longitudinal axis of the upper housing 11, bisecting the upper filter chamber 14. An air extraction port 26 communicates with the central channel 25 for removal of entrapped air.

An air extraction fitting 27 provides a seal for the air extraction port 26 preventing the egress of fluid but through which entrapped air is removed from the upper filter chamber 14. In the embodiment shown, the air extraction fitting 27 is a self sealing cap which allows for the insertion of a hypodermic needle into the central air channel for removal of air and for resealing into a fluid tight seal upon withdrawal of the needle. By virtue of the position of the air extraction port 26 and the central channel 25 the needle is inserted through the air extraction fitting 27 in a direction substantially parallel to the filtering surface of the filter 13. In this manner the danger of damaging the filter by contact with the hypodermic needle during extraction of the air is substantially avoided. Self sealing fittings of the type illustrated are well known in the art.

As an alternative embodiment, the air extraction fitting 27 is comprised of an air permeable liquid impermeable membrane. This membrane forms a liquid tight seal for the air extraction port, but allows air to bleed through the membrane as it collects adjacent the air extraction port 26. Entry of outside air into the filter unit 10 is prevented by the fluid pressure within the upper filter chamber 14. Such membrane materials are produced from thin sheets of material such as cellulose acetate and provided with extremely small pores of molecular dimensions which allow air to pass but prevent the passage of fluids. Such materials are known in the art and do not form a part of this invention.

In the preferred embodiment channels 28 and 29 are provided around the periphery of the upper housing 11 and are in communication with the central channel 25 at a point adjacent the air extraction port 26. Portions of channels 28 and 29 are disposed at an angle to the central channel 25 adjacent the air extraction port 26 so that in plan configuration the channels 28 and 29 are funnel shaped in the area adjacent the air extraction port 26. This enhances the flow of entrapped air towards the air extraction port 26. Channels 28 and 29 are open to the interior of the upper filter chamber 14 along substantially their entire length.

The outer sides of the channels 28 and 29 are extended into a downwardly depending member 30 to define the peripheral walls of the upper filter chamber 14. The peripheral configuration of the member 30 is complementary to the shape of wall member 21 of the lower housing 12 so that the lower edge surface of member 30 abuts against the upper edge surface of the wall member 21 when the upper housing 11 and the lower housing 12 are assembled as a unit. An inlet port 16 is provided in the member 30 opposite the air extraction port 25 and the port 16 communicates with a female "Luer" nipple 31 for receiving the "Luer" fitting 17.

In assembling the parts of the filter unit 10, the filter 13 is disposed on the support ribs 22 of the lower housing 12 with the edges of the filter 13 extending beyond the edges of the wall member 21. The upper housing 11 is positioned on the lower housing 12 with the edges of the members 30 of the upper housing 11 in abutment with the edge of wall member 21 and with the filter 13 interposed therebetween. The edges are sealed together in fluid tight fashion thereby to join the upper housing 11 and the lower housing 12 into a single unit with the filter 13 being secured between the abutting edges.

Any suitable sealing method is utilized for joining the upper housing 11 and the lower housing 12 such as, for example, adhesives such as solvent free epoxy adhesive or welding techniques such as ultrasonic welding and thermal welding and the like. Ultrasonic welding is the preferred method.

In utilizing the filter of this invention, the tube from a source of parenteral liquid is connected to the "Luer" fitting 17 and a tube 19 which carries a hypodermic needle, not shown, is attached to the outlet port 18. Liquid is allowed to flow into the filter unit while holding the filter unit 10 in a substantially vertical position with the outlet port 18 up. As the liquid enters the filter unit 10, air is forced through the dry portion of the filter and into the lower filter chamber 15. When the upper filter chamber 14 is filled with fluid, the fluid passes through the filter 13 and begins to fill the lower filter chamber 15. The air in the lower filter chamber 15 is replaced by the entering fluid and is forced upwardly to the outlet port 18. The configuration of the support ribs 22, the wall member 21 and member 30 adjacent the outlet port funnel the air to the outlet port and prevents the entrapment of air in the lower filter chamber 15. This procedure is carried out until the lower filter chamber 15, the tube 19 and hypodermic needle are completely full of fluid.

At this point a venopuncture is performed and the needle inserted in the patient. The filter element 10 is taped or otherwise secured to the patient adjacent the point of venopuncture with the base 20 being next to the patient. In its ideal operating position, the filter element is disposed with the upper filter chamber 14 substantially vertically disposed over the lower filter chamber 15.

In the normal operating configuation, air entering the system during the intravenous procedure, enters the upper filter chamber and is prevented from traveling any further by the filter 13. The air is collected in channels 28 and 29 and in the central channel 25. As already discussed, entrapped air is removed by insertion of a hypodermic needle through the self-sealing air extraction fitting 27 and the air drawn out without any interruption in the intravenous procedure. The hypodermic needle enters the air extraction fitting in a direction substantially parallel to the plane of the filter 13 thereby avoiding the possibility of damaging the filter with the needle. As an alternative, the air extractions fitting can comprise an air permeable fluid impermeable membrane through which entrapped air may pass without the loss of fluid.

Maintaining the filter unit 10 in the normal orientation is difficult, if not impossible. In many cases, particularly during the course of a lengthy intravenous procedure, the patient will move and the orientation of the filter unit 10 will be changed and may even become inverted. Air cannot pass through the wetted filter and therefore may become lodged against the filter surface when the orientation of the filter unit is other than ideal. This results in a reduction of the effective filter area and, if sufficient air is present and the orientation of the filter unit is substantially inverted, can result in a complete blockage of the filter system. By provision of the sloped filtering surface of the present invention, air trapped in this manner is directed to the sides of the upper filter chamber 14, thus leaving the central area of the filter free of entrapped air and maintaining an effective filtering surface.

The filter unit of the present invention is preferably manufactured from a plastic material such as polystyrene or polycarbonate materials. It is preferred that at least the upper housing 11 be transparent so that the interior of the upper filter chamber 14 can be observed during operation. The filter unit of the present invention is particularly useful as a disposable filter unit for intravenous procedures. However, it is within the scope of this invention to provide a reusable filter unit substantially as described which may be assembled and disassembled for replacement of the filter.

The above description of the invention as set forth is by way of illustration, and, as will be apparent to those skilled in the art, other variations and modifications can readily be employed without departing from the spirit and scope of the invention described and claimed below.

We claim:
1. A filter unit, comprising:
means defining a first filter chamber and a second filter chamber;
a filter element disposed between said first and second filter chambers;
inlet and outlet ports communicating with said first and second filter chambers respectively;
collecting means in said first filter chamber for collecting air entrapped therein, said collecting means including a central channel disposed in said first filter chamber and bisecting said first filter chamber, said channel communicating with said first filter chamber along substantially its entire length; and
an air extraction port in said first filter chamber and communicating therewith for removing said entrapped air.

2. The filter unit of claim 1 further comprising a pair of peripheral channels, one peripheral channel being disposed on each side of said central channel and one end of each of said peripheral channels communicating with said central channel adjacent said air extraction port, said peripheral channels being disposed along the periphery of said first filter chamber and in communication with said first filter chamber along substantially their entire length.

3. The filter of claim 2 wherein a portion of each of said peripheral channels is disposed at an angle with respect to said central channel adjacent the point of communication therewith to funnel entrapped air to said central channel adjacent said air extraction port.

4. The filter unit of claim 1 wherein said air extraction port is provided with an air extraction fitting comprising a self-sealable cap.

5. The filter unit of claim 1 wherein said air extraction port is provided with an air extraction fitting comprising an air permeable, liquid impermeable membrane.

6. A filter unit comprising:
a housing defining a chamber;
a porous filter element disposed in said chamber separating said chamber into first and second filter chamber;
an inlet port in said housing in communication with said first filter chamber;
an outlet port in said housing in communication with said second filter chamber;

means for collecting entrapped air in said first filter chamber, said means communicating with an air extraction port in said first filter chamber and being adapted for selectively removing entrapped air from said first filter chamber while maintaining fluid therein; and means disposed in said housing for carrying said filter so that at least a portion of the surface of said filter is non-horizontal regardless of the orientation of said filter unit.

7. The filter unit of claim 6 wherein said means for collecting entrapped air comprises a central channel disposed in said housing bisecting said first filter chamber, said channel communicating with said first filter chamber along substantially its entire length.

8. The filter unit of claim 7 further comprising a pair of peripheral channels, one peripheral channel being disposed on each side of said central channel and one end of each of said peripheral channels communicating with said central channel adjacent said air extraction port, said peripheral channels being disposed along the periphery of said first filter chamber and in communication with said first filter chamber along substantially their entire length.

9. The filter of claim 8 wherein a portion of each of said peripheral channels adjacent the point of communication with said central channel is biased with respect to the longitudinal axis of said central channel thereby to funnel entrapped air to said central channel adjacent said air extraction port.

10. The filter unit of claim 6 wherein said air extraction port is provided with an air extraction fitting comprising a self-sealable cap.

11. The filter unit of claim 6 wherein said air extraction port is provided with an air extraction fitting comprising an air permeable, liquid impermeable membrane.

12. The filter unit of claim 6 wherein said housing comprises:

a base carrying a wall member defining the peripheral wall of said second filter chamber, and an opening in said wall member defining said outlet port;

said wall member adjacent either side of said outlet port being biased with respect to the axis of rotation of said outlet port so as to define in plan configuration a funnel for directing fluid out of said second filter chamber.

13. The filter unit of claim 12 wherein a plurality of spaced apart, parallel elonated ribs are disposed on said base in the area defined by said wall member, the upper edges of said ribs defining a support surface for said filter which slopes towards said base from the interior of said second filter chamber to said wall member.

14. The filter unit of claim 13 wherein said ribs extend in the direction of said outlet port, the spaces between adjacent ribs defining channels for the passage of fluid to said outlet port.

15. The filter unit of claim 14 wherein said support surface slopes toward said base in a direction normal to the axes of said support ribs.

16. A filter unit for the filtration of parenteral fluid during the intravenous administration thereof comprising:

an upper and lower housing defining a chamber;

a porous filter disposed between said upper and lower housings separating said chamber into an upper filter chamber and a lower filter chamber;

an inlet port in said upper housing in communication with said upper filter chamber;

a central channel in said upper housing communicating therewith along substantially its entire length;

an air extraction port in said upper housing communicating with said central channel;

a peripheral channel disposed on each side of said central channel and communicating therewith adjacent said air extraction port, a portion of the length of said peripheral channel adjacent the point of communication with said central channel being biased with respect to said central channel for funneling entrapped air to said central channel, said peripheral channels being open to said upper filter chamber along substantially their entire length;

said lower housing comprising a base carrying a wall member defining the peripheral wall and the interior of said lower filter chamber, said wall member provided with an opening defining an outlet port, said wall member adjacent either side of said outlet port being biased with respect to the axis of rotation of said outlet port so as to define in plan configuration a funnel for directing fluid out of said lower filter chamber;

a plurality of spaced apart upstanding, parallel elongated ribs disposed on said base in the interior of said lower filter chamber, said ribs disposed so that the longitudinal axes thereof are parallel to the axis of rotation of said outlet port and the spaces between said ribs defining channels for the passage of fluid to said outlet port, the upper edges of said ribs defining a support surface for said filter that slopes downwardly from the interior of said lower filter chamber in a direction normal to the longitudinal axes of said ribs; and a flange carried by said base for securing said filter unit adjacent the area of intravenous administration.

* * * * *